Figure 1:
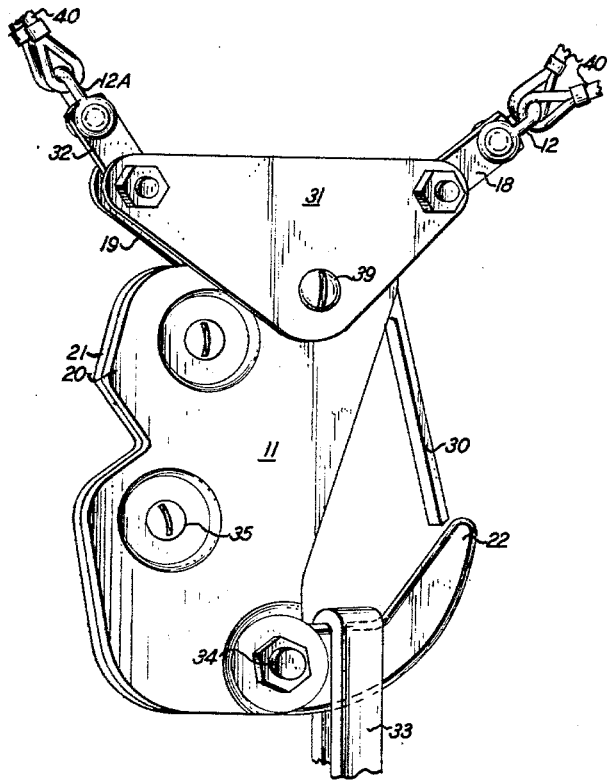

April 6, 1965 M. COZZOLI 3,177,028
HELICOPTER CARGO HOOK
Filed Aug. 15, 1961 6 Sheets-Sheet 1

INVENTOR
MICHAEL COZZOLI

BY Mason, Mason & Albright
ATTORNEYS

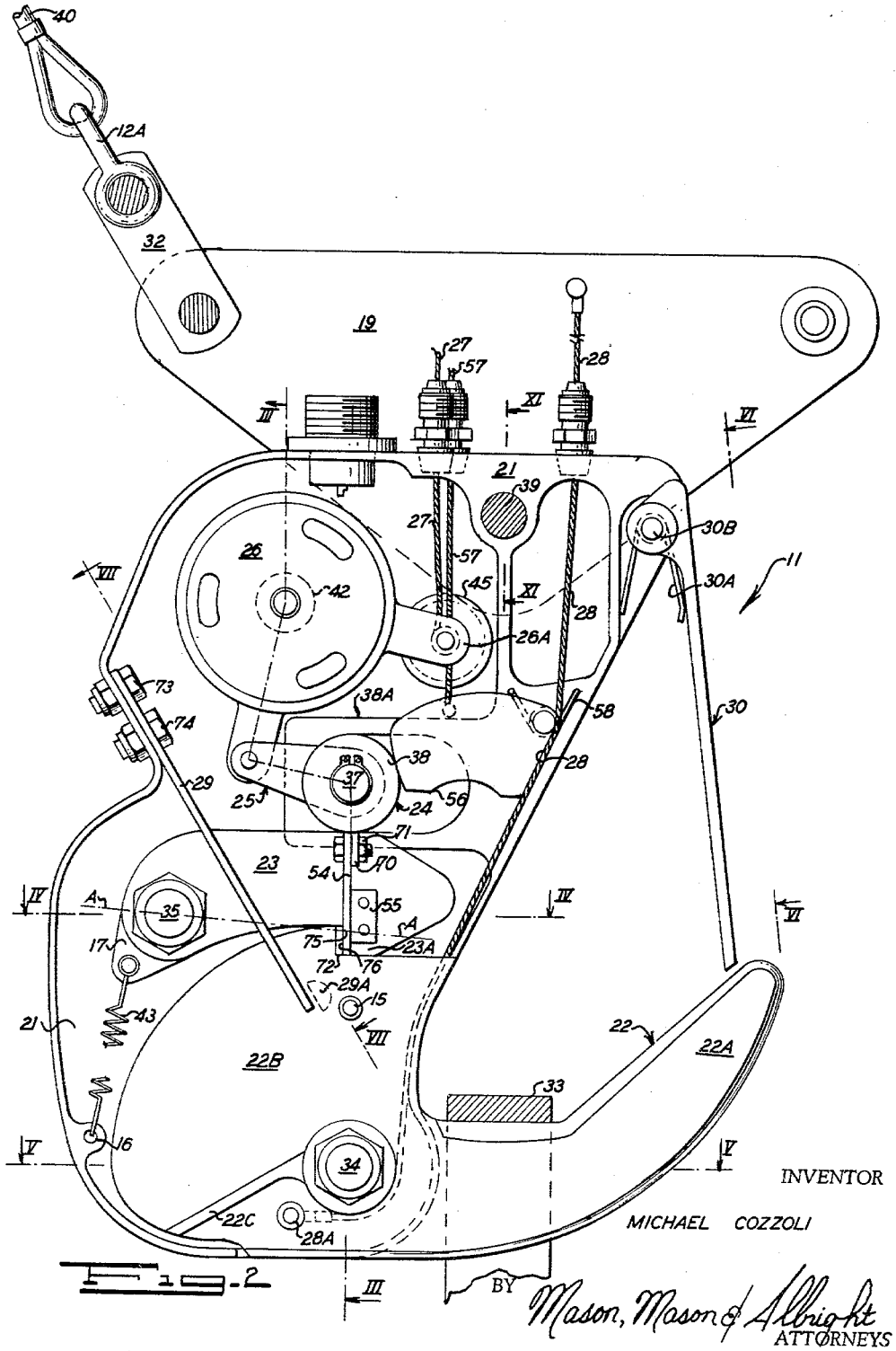

April 6, 1965
M. COZZOLI
3,177,028
HELICOPTER CARGO HOOK
Filed Aug. 15, 1961
6 Sheets-Sheet 3
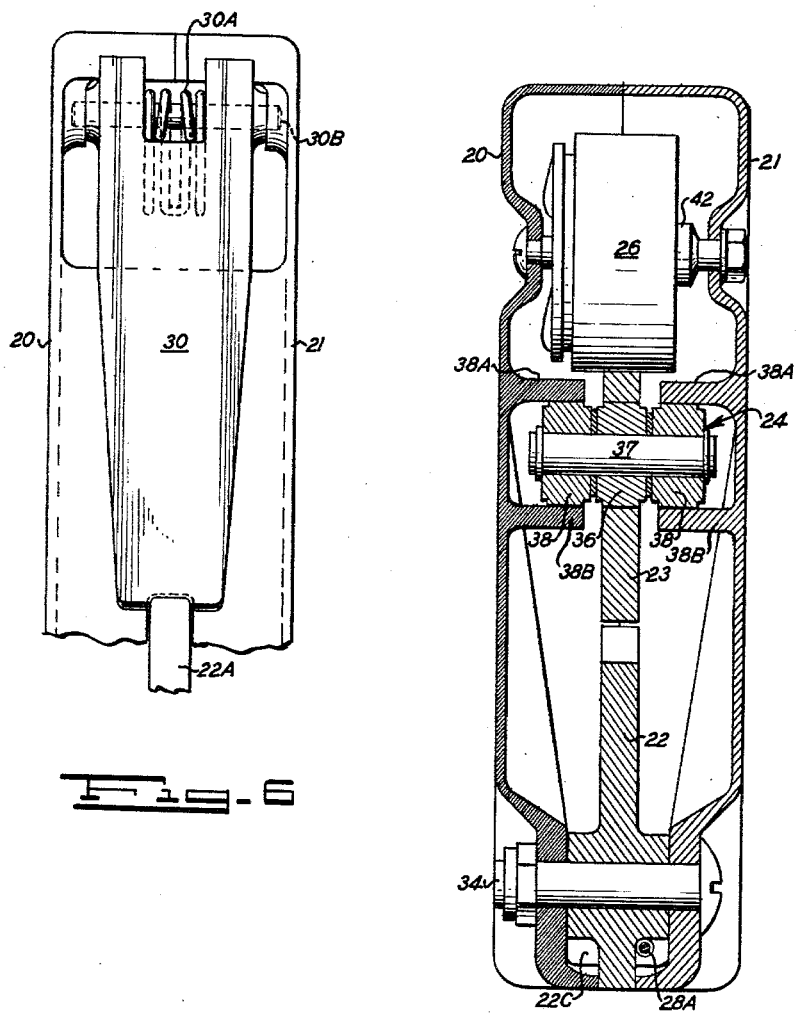
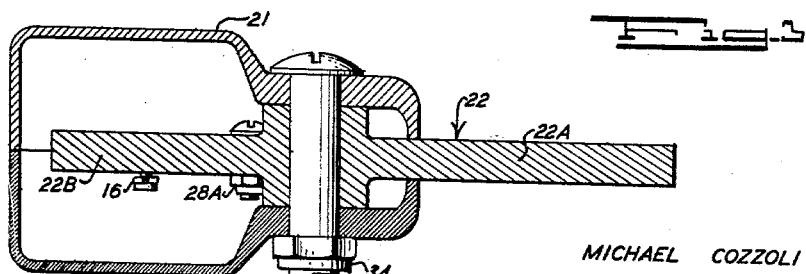
INVENTOR
MICHAEL COZZOLI
BY *Mason, Mason & Albright*
ATTORNEYS

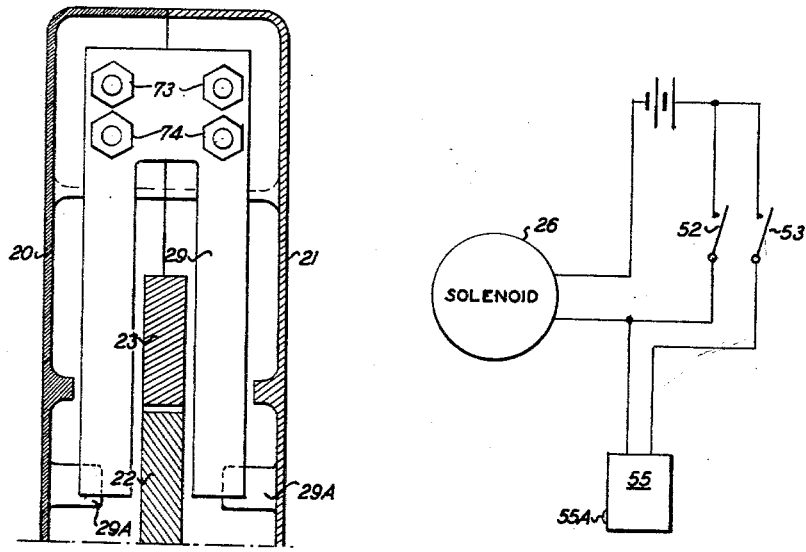
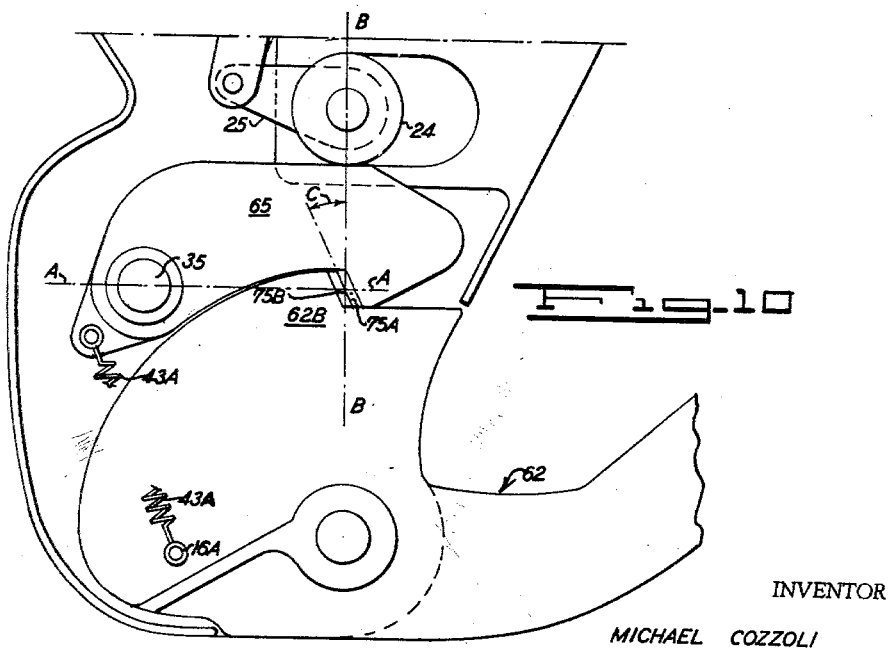

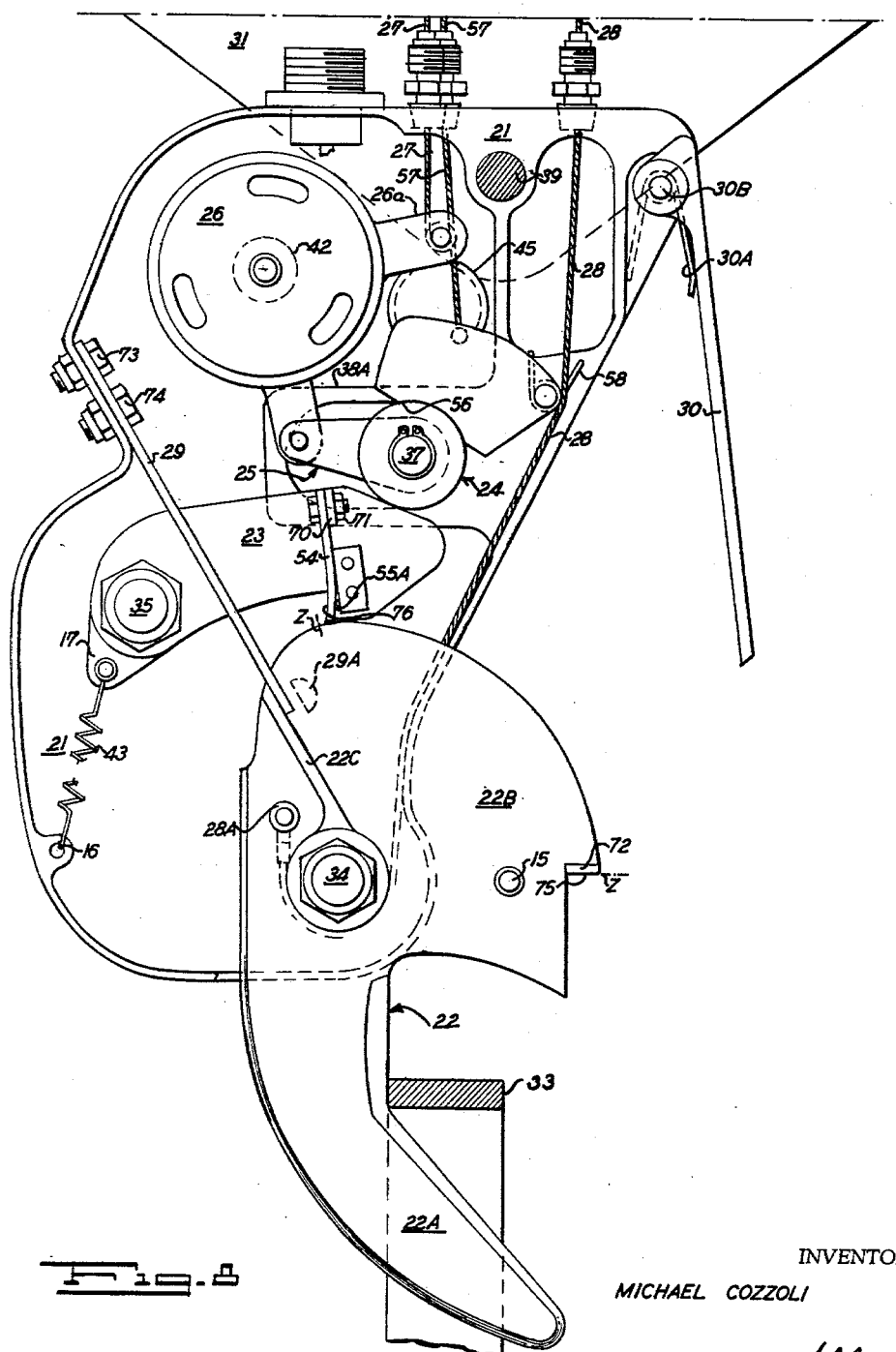

April 6, 1965     M. COZZOLI     3,177,028
HELICOPTER CARGO HOOK
Filed Aug. 15, 1961     6 Sheets-Sheet 6

INVENTOR
MICHAEL COZZOLI

BY *Mason, Mason & Albright*
ATTORNEYS

United States Patent Office 3,177,028
Patented Apr. 6, 1965

3,177,028
HELICOPTER CARGO HOOK
Michael Cozzoli, Hagerstown, Md.; Michael P. Cozzoli, John D. Cozzoli, and Thomas E. Cozzoli, administrators of said Michael Cozzoli, deceased
Filed Aug. 15, 1961, Ser. No. 131,523
7 Claims. (Cl. 294—83)

This invention relates to a cargo hook and has particularly to do with novel helicopter cargo hook which can be engaged and disengaged without assistance from a ground crew under load and no-load conditions remotely within the helicopter.

A number of attempts have been made in the past several years to design a self-engaging and remotely releasable cargo hook for helicopters which are utilized for transporting equipment and supplies from one point to another.

The load carrying capacity of a helicopter has been and still in increasing. However, the force available to release a helicopter cargo hook remotely from within the helicopter has remained basically the same and a more efficient mechanism is desirable which will enable the crew within the aircraft to release the loads. Moreover, the basic hook design should be such that it can satisfy the various practical requirements which are frequently encountered. For example, the hook should, if desired, be capable of automatically releasing its load on touching the ground. In addition, it is often desirable that there be an automatic resetting of the hook after the release of the load. Further, locking means may be desired to prevent inadvertent release of the load. Present hooks have protrusions which may snag on the sling in loading operations. When this occurs, it causes a delay in the engaging operation. The elimination of such protrusions will increase the proficiency of the hook.

The fact that there are size and weight limitations for the desired hook, in itself, imposes certain restrictions on the designers. Efforts to date, have generally resulted in complex hooks requiring a multiplicity of parts. However, the overabundance of parts creates a problem of unreliability which is unacceptable in a hook of the nature involved. Further, many of these hooks have utilized toggle joints in the locking system which experience has shown to be unsatisfactory due to the fact that they required precise setting and any mis-alignment due to manufacturing tolerances, wear, or the inertia forces imposed on them, may cause the hook to release prematurely, thereby making them unreliable.

It is the object of this invention to provide a highly reliable self-engaging and remotely controlled release cargo hook for the specific application to helicopter operation which meets the above requirements of load design. More narrowly, it is an object of this invention to provide an improved basic design for a helicopter cargo hook which is self-engaging, remotely releasable from the aircraft either by electical means or by manual means, not dependent on close tolerances to function properly, and one on which the load imposed on the locking mechanism is normal to the direction of the load required to release the mechanism thereby eliminating any tendency of the load to prematurely release the hook.

Figure 4:
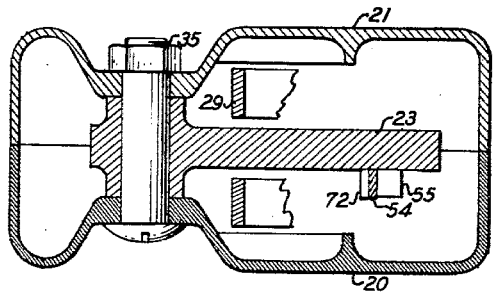
Figure 11:
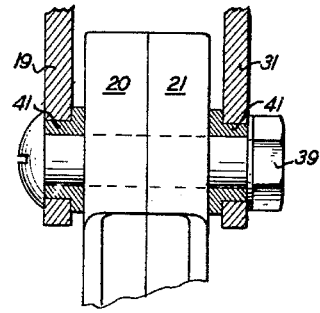
Figure 12:
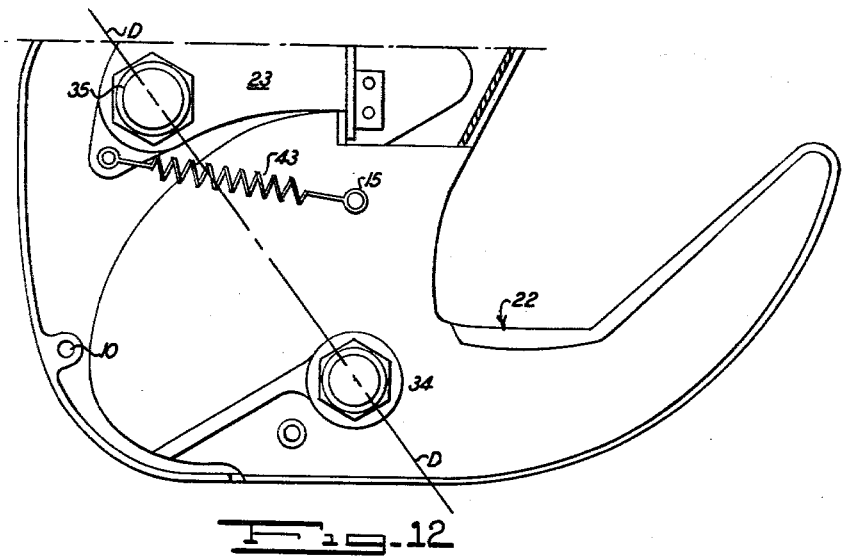
Figure 13:
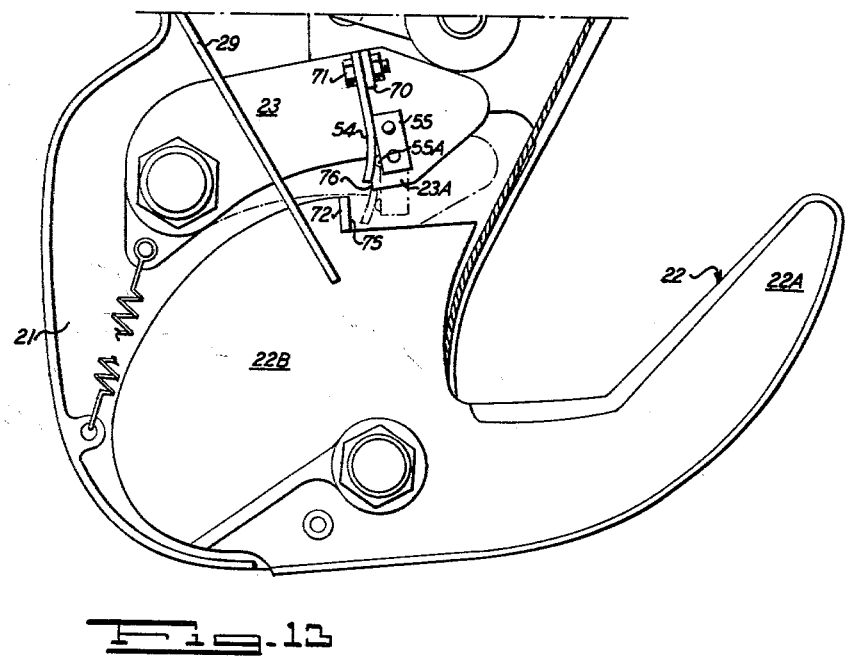

The invention is illustrated in the preferred embodiment in the accompanying drawings which:

FIGURE 1 is a perspective view of the cargo hook;
FIGURE 2 is a side view of the cargo hook with a slide cover plate removed showing the mechanism in its locked position;
FIGURE 3 is a sectional view taken on lines III—III of FIGURE 2;
FIGURE 4 is a sectional view taken on lines IV—IV of FIGURE 2;
FIGURE 5 is a sectional view taken on lines V—V of FIGURE 2;
FIGURE 6 is a sectional view taken on lines VI—VI of FIGURE 2;
FIGURE 7 is a sectional view taken on lines VII—VII of FIGURE 2;
FIGURE 8 is a view similar to FIGURE 2 showing the internal mechanism of the cargo hook in its released position;
FIGURE 9 is a diagram of the automatic release electrical circuit;
FIGURE 10 is a broken view similar to FIGURE 2 showing an alternate embodiment of the pawl and load beam;
FIGURE 11 is a sectional view taken on lines XI—XI of FIGURE 2;
FIGURE 12 shows an alternate spring connection to obtain an automatic reset of the load beam; and
FIGURE 13 is a broken view similar to FIGURE 2 showing the load beam in complete retraction.

It is to be understood that although the invention described herein is for a remotely controlled cargo hook specifically designed for helicopter operation, the scope of the invention is not limited to this specific application.

Referring now to FIGURES 1 and 2, the basic hook designated generally as 11 consists of two side housings or cover plates 20 and 21 between which are included the following components: a load beam 22 which has a forward hook portion 22A, and after catch portion 22B, a pawl 23, rollers 24, the roller links 25, a solenoid actuator 26, a manual release cable 27, a manual reset cable 28, a lock release cable 57, a bumper spring 29, and a keeper 30.

External to the housings 20 and 21 are two adapter plates 19 and 31 which provide support for the hook 11 and are joined by means of bolt 39. Bushings 41 are provided to permit rotation of hook 11 about pivot bolt 39. Connecting the adapter plates 19 and 31 in their upper aspect are two shackle adapters 18 and 32. Two shackles 12 and 12A engage the shackle adapters 18 and 32 and are in turn engaged by the cables 40 which depend from a helicopter (not shown).

The load which is to be carried is applied to the load beam 22 through the adapter sling 33. The weight of this load is carried by the load beam pivot bolt 34 which is mounted between the housings 20 and 21. It will be noted, that the downward force on the adapter sling 33 causes a clockwise moment in load beam 22 which reacts in its catch portion 22B against the offset portion 23A of pawl 23. Thus the load on the adapter sling 33 is reacted horizontally against the pawl 23 and the pawl pivot bolt 35 which is mounted between the housings 20 and 21. It has been found important that where the catch portion 22B engages offset portion 23A, a tough, hard, surface be provided—such as, for example, stellite facings 75 and 76 which are affixed to catch portion 22B and offset portion 23A, respectively.

In the after part of the pawl 23 there is a projection 17. Attached to projection 17 is a spring 43 which connects on its other end at 16 to the side plates 20 and 21. As will be noted from FIGURE 2, the spring 43 tends to move the pawl 23 in a counter-clockwise direction. Any center line as A—A, projecting from the pivot bolt 35 and intersecting the line formed by the interengaging surfaces of the offset portion 22B of the load beam 22 forms therewith an obtuse angle which opens toward the greater portion of catch portion 22B of the load beam 22. For this reason, the torque from the load on sling 33 will tend to cause the pawl 23 to raise and thus disengage the catch portion 22B of the load beam 22. It will thus be noted that there are two forces which are urging the pawl 23 to move counter-clockwise and thus disengage the load beam 22. These forces result from the action of spring 43 and the moment due to the position of the pawl pivot bolt 35 in relation to the catch surface of the offset portion 23A. However, these forces are countered by the locking effect of rollers 24. It is to be noted that planes comprising the top of pawl 23 and the bottom of guide projection 38A are parallel and that these planes are normal to the vertical center line of rollers 24 which intersects the points of contact between rollers 24, pawl 23 and projection 38A. As the unlocking loads which are reacted by the rollers 24 act along its vertical center line, there is no tendency for these loads to cause the rollers 24 to move to the released position shown in FIGURE 8. It will be noted also that the above condition is true for all positions of the rollers 24 along the top portion of pawl 23.

Looking at FIGURE 3, it will be seen that the rollers 24 comprise a center roller 36 and two outer rollers 38 which are carried together on a shaft 37. The upward force of the pawl 23 is carried by the center roller 36 which, by means of the shaft 37, transmits the force to the outer rollers 38. The outer rollers 38 are held in place by guidance means comprising upper projections 38A and lower projections 38B incorporated in the housings 20 and 21 and projecting inwardly. As the projections 38A are parallel to the top of the pawl 23, as shown in FIGURE 2, there is no tendency for the rollers 24 to move horizontally with load applied normally thereto.

Release of the load is accomplished by pulling on the manual release cable 27 or by the energizing of the actuator 26 which causes the roller links 25 to move the rollers 24 horizontally to the position shown in FIGURE 8. However, before the rollers can move, the locking bellcrank 56 must be pulled up manually by the locking cable 57 against the moment produced by the lock spring 58. With the bellcrank 56 in position as shown in FIGURE 2, it is impossible to release the mechanism by either the electrical or manual means. When the rollers 24 are brought to the released position shown in FIGURE 8, the pawl 23 is no longer held down and is free to be rotated counter-clockwise about the pawl pin 35 due to the upward component of force from load beam 22 until it is free of the catch portion 22B of the load beam 22. When this occurs, the load beam 22 is released to rotate in a clockwise direction about the load beam pivot bolt 34 to the position shown in FIGURE 8. With the load beam 22 in this position, the adapter sling 33 slides off thereby freeing the load from the hook. When the load beam 22 is released under the full load conditions, the bumper spring 29 which is secured within hook 11 to housings 20 and 21 by bolts 73 and 74 or other suitable securing means, is engaged by projections 22C extending from each side of load beam 22 and in doing so absorbs the kinetic energy of the load beam 22. With a heavy load, projections 22C may strike the bumper spring 29 with a considerable impact. For this reason stops 29A, which project from housings 20 and 21, are provided a short distance from the ends of bumper spring 29 to prevent them from deflecting to the point that projections 22C move past the bumper spring 29 on either side. The hook is held in its released configuration shown in FIGURE 8 by the cam surface Z—Z (see FIGURE 8) in the catch portion 22B of the load beam 22.

To reset the hook from its released position it is only necessary to pull on the manual reset cable 28 until the load beam 22 is brought to the position shown in FIGURE 13. It will be noted that cable 28 is led around pivot bolt 34 to connect with a securing means 28A fixed to load beam 22. A return spring 42 of the actuator 26 causes the rollers 24 to assume the position shown in FIGURE 2 by urging actuator 26 in a clockwise direction. The cable 27 is connected to a projection 26A of the actuator 26. A cover 45 is provided in the housing 20 to close the corresponding opening in such housing through which the cable connection can be made and inspected.

It will be noted, that the angle between the transverse center line A—A and the meeting of facings 75 and 76 is of such magnitude that the moment created by the load beam is just slightly greater than the angle of friction at the point whereby the pawl 23 is moved upward by the lateral force of load beam 22. FIGURE 10 shows an alternate method of accomplishing the same effect. In this embodiment a transverse horizontal center line A—A of the pawl pivot bolt 35 cuts the area of engagement between a pawl 65 and the after portion 62B of a load beam 62 at the meeting of facings 75A and 76A. The surface of engagement is slanted so that the angle C between line A—A and line B—B, which is perpendicular to the top of pawl 65, is slightly greater than the angle of friction to allow the pawl 65 to be moved upward by the lateral force from load beam 62. FIGURE 10 also shows the spring 43A connected to a pin 16A located on load beam 62. So located, spring 43A tends to move pawl 65 in a counter-clockwise direction and to move the load beam 62 in a clockwise direction.

If desired, the hook 11 can be adjusted so as to reset itself automatically. This is accomplished simply by the relocation of the lower end of spring 43 from connection 16 to pin 15 on the catch portion 22B of the load beam 22 as shown in FIGURE 12. With the spring 43 so attached to pin 15 across a center line D—D intercepting the centers of bolts 34 and 35, on releasing the load the spring 43 returns the load beam 22 to the position shown in FIGURE 12.

FIGURE 9 shows a wiring diagram for an automatic release feature at the touch down of the load. This is accomplished by the addition of the automatic release leaf spring 54 (see FIGURE 13) which is connected to a lug 70 extending from pawl 23 by a nut and bolt 71 or other suitable securing means. Spring 54, which has a pre-determined capacity, bears against a projection 72 which extends from catch portion 22B proximate to the offset portion 23A of pawl 23. When the capacity of spring 54 is exceeded, it is deflected sufficiently (as shown in FIGURE 2) so that switch 55, which is appropriately attached to pawl 23, is opened through the agency of the switch button 55A which bears against the spring 55. When this occurs, as is apparent from the diagram in FIGURE 9, the solenoid 26 will not normally operate to release the load unless the regular release switch 52 is closed. However, with the arming switch 53 in its closed position and the reduction of the load which occurs when the load touches the ground, the automatic release switch 55 energizes the actuator 26 causing the mechanism to assume the release position shown in FIGURE 8, thereby releasing the load.

The keeper 30, which is pivoted from hook 11 by pin 30B held between housings 20 and 21, is arranged so that it is normally held outward as shown in FIGURE 2 by the urging of spring 30A, but may be deflected inwardly on contact with adapter sling 33 during engagement. Thus, when the load beam 22 is in closed position, sling 33 cannot be disengaged.

Prior to a helicopter pick-up, a load is prepared on the ground in such a way as to have a semi-flexible annular sling adapter 33 anchored on top of a load which stands vertically. A helicopter descends from the vicinity of the load and the pilot, guided by a crew member to whom the hook 11 and the load are visible, maneuvers the hook 11 to engage the load. The load is applied to the load beam 22 through the adapter sling 33 as shown in FIGURE 1. The helicopter then rises and carries the load suspended from hook 11. As the adapter plates 19 and 31 are relatively fixed when the suspension cables 40 from the helicopter are attached to the shackle adapters 18 and 32, the cargo hook 11 is free to rotate or swing fore and aft about the spacer bushing 41 (see FIGURE 11). This single point suspension permits the cargo hook to align itself to any attitude the load may take both from dragging forward or rearward on the ground or maneuvering in flight.

On reaching its destination, the helicopter descends until the load touches the ground at which time the pilot or a crew member releases hook 11 by either manually pulling cable 27 or by the electrical means at his disposal. If the arming switch 53 was previously closed and bellcrank 56 raised, the release will be automatic. After the release the load beam 22 may be reset by pulling on cable 28. This brings the load beam 22 to the position of retraction shown in FIGURE 13 and the pawl will lower as shown by dotted lines in FIGURE 13 due to the action of the return spring 42 which returns the actuator, roller links 25 and rollers 24 to the position shown in FIGURE 2. Of course, it will be understood if the lower end of spring 43 is attached to pin 15 rather than 16 (see FIGURE 12) then the resetting will be automatic.

It will be appreciated that although a rotary solenoid 26 is shown, any other type of electric, hydraulic, or pneumatic actuator may be employed to move the mechanism to its released position.

The above description and drawings disclose several embodiments of the invention and specific language has been employed in describing the several figures. It will, nevertheless, be understood that no limitations of the scope of the invention are thereby contemplated, and the various alterations and modifications may be made such as would occur to one skilled in the art to which the invention relates.

I claim:

1. A cargo hook comprising a housing, a load beam pivot secured within said housing, a load beam pivoted on said pivot, said load beam including a hook portion extending forwardly from said pivot out of said housing and an after catch portion extending rearwardly from said pivot, a pawl including an offset portion removably engaging said catch portion, a pawl pivot bolt mounted in said housing, said pawl pivot bolt carrying said pawl, a centerline projecting from said pawl pivot bolt and intersecting the interengaging surfaces of said offset portion of said pawl and said catch portion of said load beam forms therewith an obtuse angle which opens towards the greater portion of said catch portion of said load beam, a holding device including rollers with guide means and a locking member for said rollers, said rollers holding said offset portion of said pawl in engagement with said catch portion of said load beam, and actuation means for moving said rollers from said pawl whereby the weight of said hook portion of said load beam causes said catch portion to disengage said offset portion of said pawl and said hook thereby opens.

2. A cargo hook comprising a housing, a load beam pivot secured within said housing, a load beam pivoted on said pivot, said load beam including a hook portion extending forwardly from said pivot out of said housing, and after catch portion extending rearwardly from said pivot, a pawl with an offset portion removably engaging said catch portion, a pawl pivot bolt mounted in said housing, said pawl pivot bolt carrying said pawl, a centerline projecting from said pawl pivot bolt and intersecting the interengaging surfaces of said offset portion of said pawl and said catch portion of said load beam forms therewith an obtuse angle which opens towards the greater portion of said catch portion of said load beam, guide means incorporated in said housing substantially parallel to and above said pawl, rollers interposed between said pawl and said guide means removably holding the offset portion of said pawl in engagement with said catch portion of said load beam, a locking member in engagement with said rollers, means for manually moving said locking members out of engagement with said rollers, and actuation means for moving said roller means along said guide means to disengage said roller means from said pawl whereby the weight of said hook portion of said load beam causes said catch portion to disengage said offset portion of said pawl and said hook thereby opens.

3. A cargo hook comprising a housing, a load beam pivot mounted within said housing, a load beam pivoted on said pivot, said load beam including a hook portion extending forwardly from said pivot out of said housing and an after catch portion extending rearwardly from said pivot within said housing, a pawl with an offset portion removably engaging said catch portion, a pawl pivot bolt mounted in said housing, said pawl pivot bolt pivotally carrying said pawl, a centerline projecting from said pawl pivot bolt and intersecting the interengaging surfaces of said offset portion of said pawl and said catch portion of said load beam forms therewith an obtuse angle which opens towards the greater portion of said catch portion of said load beam, a holding device including rollers with guide means and a locking member for said rollers, said rollers holding the offset portion of said pawl in engagement with said catch portion of said load beam, actuation means for removing said rollers from said pawl whereby force on said hook portion of said load beam causes said catch portion to disengage said offset portion of said pawl and said hook thereby opens, and closing means for said load beam whereby when said hook is closed said pawl again engages in its offset portion said catch portion of said load beam and said rollers holds said offset portion of said pawl in engagement of said catch portion of said load beam.

4. A cargo hook comprising a housing, a load beam pivot mounted within said housing, a load beam pivoted on said pivot, said load beam including a hook portion extending forwardly from said pivot out of said housing and an after catch portion extending rearwardly from said pivot within said housing, a pawl with an offset portion, a leaf spring of pre-determined capacity included in said offset portion of said pawl and engaging said catch portion, a switch means included in said pawl, said switch means responsive to said leaf spring whereby when said leaf spring carries a load from said catch portion of pre-determined capacity said switch is opened, means tending to disengage said leaf spring together with said pawl from said catch portion, a holding device removably holding said pawl together with said leaf spring in engagement with said catch portion of said load beam, and means actuated by the closing of said switch for removing said holding device from said pawl, whereby when said leaf spring allows such said switch to close said means removes said holding device from said pawl and said hook thereby opens.

5. A cargo hook comprising a housing having sides, a load beam pivot secured within said housing to each of its sides, a load beam pivoted on said pivot, said load beam including a hook portion extending forwardly from said pivot from said housing and an after catch portion extending rearwardly from said pivot between the sides of said housing, a pawl including an offset portion removably engaging said catch portion, a pawl pivot bolt mounted within said housing to each of its sides, said pawl pivot bolt carrying said pawl, a centerline projecting from said pawl pivot bolt and intersecting the interengaging surfaces of said offset portion of said pawl and said catch portion of said load beam forms therewith an obtuse angle which opens towards the greater portion of said catch portion of said load beam, a holding device including rollers with guide means and a locking member for said rollers, said rollers holding said offset portion of said pawl in engagement with said catch portion of said load beam and actuation means mounted between the sides of said housing for moving said rollers from said pawl, whereby the weight of said hook portion of said load beam causes said catch portion to disengage said offset portion of said pawl and said hook thereby opens, the outer sides of said housing being countersunk to receive said load beam pivot, said pawl pivot, and the mounting for said actuation means whereby no protrusions extend from said housing which may snag on cargo nets and the like.

6. A cargo hook comprising a housing, a load beam pivot secured within said housing, a load beam pivoted on said pivot, said load beam including a hook portion extending forwardly from said pivot out of said housing and an after catch portion extending rearwardly from said pivot, a pawl including an offset portion removably engaging said catch portion, a pawl pivot bolt mounted in said housing, said pawl pivot bolt carrying said pawl, a centerline projecting from said pawl pivot bolt and intersecting the interengaging surfaces of said offset portion of said pawl and said catch portion of said load beam forms therewith an obtuse angle which opens towards the greater portion of said catch portion of said load beam, a holding device movably holding said offset portion of said pawl in engagement with said catch portion of said load beam, a projection from said pawl opposite relative to said pawl pivot to said offset portion, resilient means interconnecting said projection to said catch portion across a centerline intersecting the axes of said pawl pivot bolt and said load beam pivot, and actuation means for removing said holding device from said pawl whereby a weight on said hook portion of said load beam causes said catch portion to disengage said offset portion of said pawl and said hook thereby opens and with said weight removed, said resilient means resets said hook in a closed position.

7. A cargo hook comprising a housing, a load beam pivot mounted within said housing, a load beam pivoted on said pivot, said load beam including a hook portion extending forwardly from said pivot out of said housing and an after catch portion extending rearwardly from said pivot within said housing, a pawl with an offset portion removably engaging said catch portion, a pawl pivot bolt mounted in said housing carrying said pawl, means tending to disengage said offset portion of said pawl from said catch portion of said load beam, a holding device including rollers with guide means and a locking member for said rollers, said rollers holding the offset portion of said pawl in engagement with said catch portion of said load beam, said guide means projecting from said housing delimiting the path of movement of said holding device parallel to at least part of an area wherein said pawl is engaged, actuation means mounted within said housing for moving said rollers from said pawl whereby the weight of said hook portion of said load beam causes said catch portion to disengage said offset portion of said pawl and said hook thereby opens.

References Cited in the file of this patent
UNITED STATES PATENTS

| | | |
|---|---|---|
| 905,576 | Porter | Dec. 1, 1908 |
| 2,358,101 | Randall | Sept. 12, 1944 |
| 2,575,986 | Yoder | Nov. 20, 1951 |
| 2,789,468 | Burns | Apr. 23, 1957 |
| 2,868,581 | Minty | Jan. 13, 1959 |
| 2,989,336 | Henry | June 20, 1961 |

FOREIGN PATENTS

| | | |
|---|---|---|
| 10,861 | Great Britain | of 1915 |